United States Patent
Okamoto et al.

(10) Patent No.: US 8,001,721 B2
(45) Date of Patent: Aug. 23, 2011

(54) PLANT CULTIVATION SYSTEM

(75) Inventors: Akihiro Okamoto, Hiratsuka (JP); Manabu Fujii, Hiratsuka (JP); Hiroshi Yoshioka, Hiratsuka (JP); Yuichi Mori, Hiratsuka (JP)

(73) Assignee: Mebiol Inc., Hiratsuka-shi (JP)

( * ) Notice: Subject to any disclaimer, the term of this patent is extended or adjusted under 35 U.S.C. 154(b) by 156 days.

(21) Appl. No.: 12/376,748

(22) PCT Filed: Sep. 10, 2007

(86) PCT No.: PCT/JP2007/067578
§ 371 (c)(1),
(2), (4) Date: Feb. 6, 2009

(87) PCT Pub. No.: WO2008/035580
PCT Pub. Date: Mar. 27, 2008

(65) Prior Publication Data
US 2010/0186298 A1    Jul. 29, 2010

(30) Foreign Application Priority Data

Sep. 20, 2006  (JP) .................................. 2006-254439
May 30, 2007  (JP) .................................. 2007-144202

(51) Int. Cl.
*A01G 13/02* (2006.01)
*A01G 27/02* (2006.01)

(52) U.S. Cl. .............................................. 47/21.1; 47/79

(58) Field of Classification Search ................ 47/79, 80, 47/21.1
See application file for complete search history.

(56) References Cited

U.S. PATENT DOCUMENTS

| | | | | |
|---|---|---|---|---|
| 4,001,968 A | * | 1/1977 | Green | 47/80 |
| 4,079,547 A | * | 3/1978 | Walker | 47/62 R |
| 4,245,434 A | * | 1/1981 | Green | 47/80 |
| 4,287,682 A | * | 9/1981 | Browne | 47/81 |
| 4,955,158 A | * | 9/1990 | Lyon | 47/81 |
| 5,247,762 A | * | 9/1993 | Green | 47/79 |
| 6,178,691 B1 | * | 1/2001 | Caron et al. | 47/79 |
| 6,484,439 B1 | | 11/2002 | Tonkin et al. | |
| 7,152,370 B2 | * | 12/2006 | Caron et al. | 47/82 |
| 2004/0093793 A1 | | 5/2004 | Mori et al. | |
| 2006/0112632 A1 | | 6/2006 | Mori et al. | |
| 2006/0257213 A1 | * | 11/2006 | Johnsen | 405/302.7 |

FOREIGN PATENT DOCUMENTS

| | | |
|---|---|---|
| CA | 2 513 500 A1 | 8/2004 |
| CA | 2 498 070 A1 | 8/2006 |
| CA | 2 498 077 A1 | 8/2006 |
| CA | 2 568 126 A1 | 5/2007 |
| JP | 2001-292643 A | 10/2001 |
| JP | 2003-506051 A | 2/2003 |

* cited by examiner

OTHER PUBLICATIONS

Canadian Office Action, dated Jun. 14, 2010, for Canadian Application No. 2,660,284.

*Primary Examiner* — Son T. Nguyen
(74) *Attorney, Agent, or Firm* — Birch, Stewart, Kolasch & Birch, LLP.

(57) ABSTRACT

To provide a system for producing safe and high nutrition vegetables at low cost.

A plant cultivation system for cultivating a plant on a nonporous hydrophilic film, which comprises a nonporous hydrophilic film and a feeding means for supplying water or a nutrient fluid to the lower surface of the film in the absence of a hydroponic tank for accommodating water or a nutrient fluid and cultivating a plant therein. As the feeding means, use is made of a water absorbing material which is in contact with the film and which is disposed between the film and a water impermeable material. A system for producing safe and high nutrition vegetables at low cost can be obtained by disposing the water impermeable material directly on ground soil, whereupon the water absorbing material and an irrigation tube are disposed, followed by disposing the film thereon.

11 Claims, 2 Drawing Sheets

[Fig. 1]
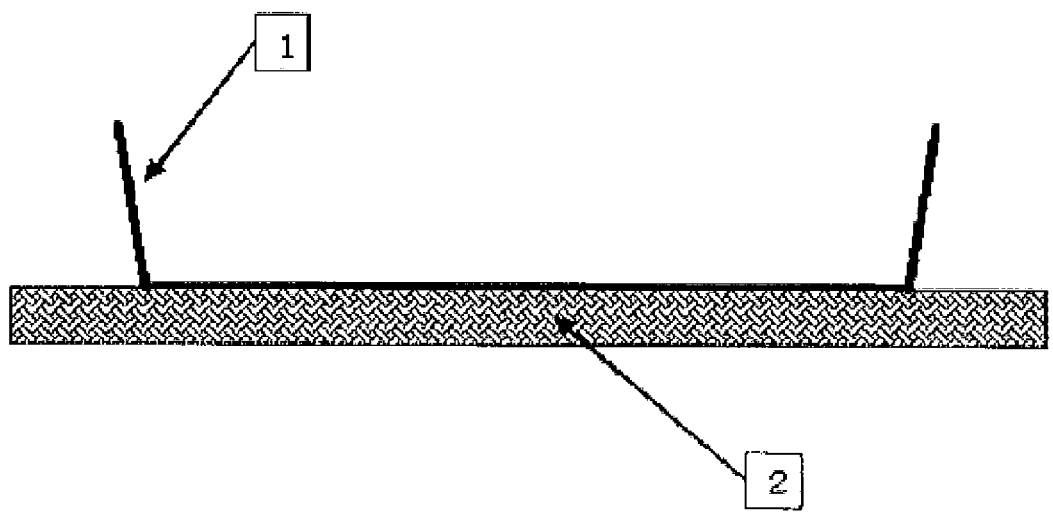
[Fig. 2]
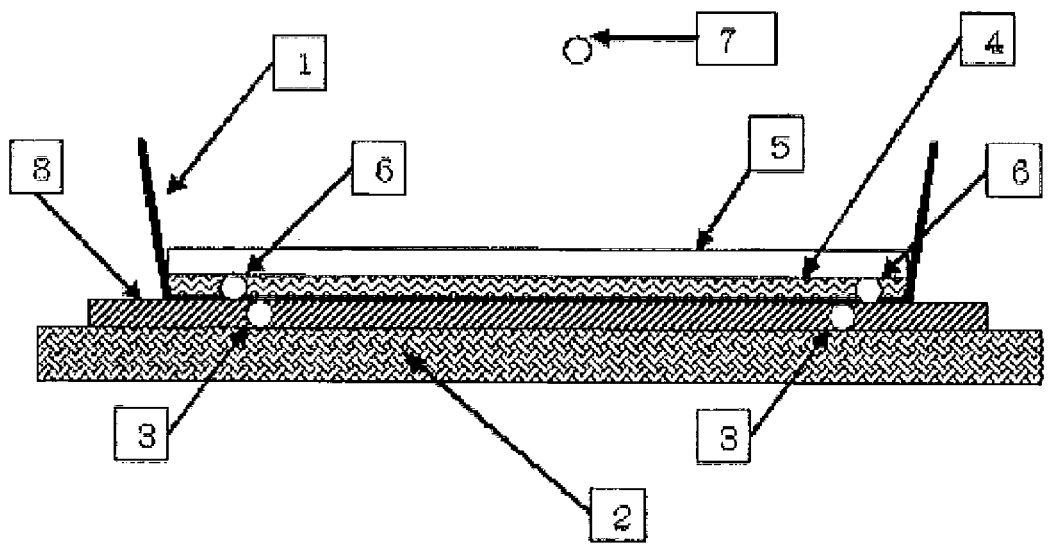

[Fig. 3]
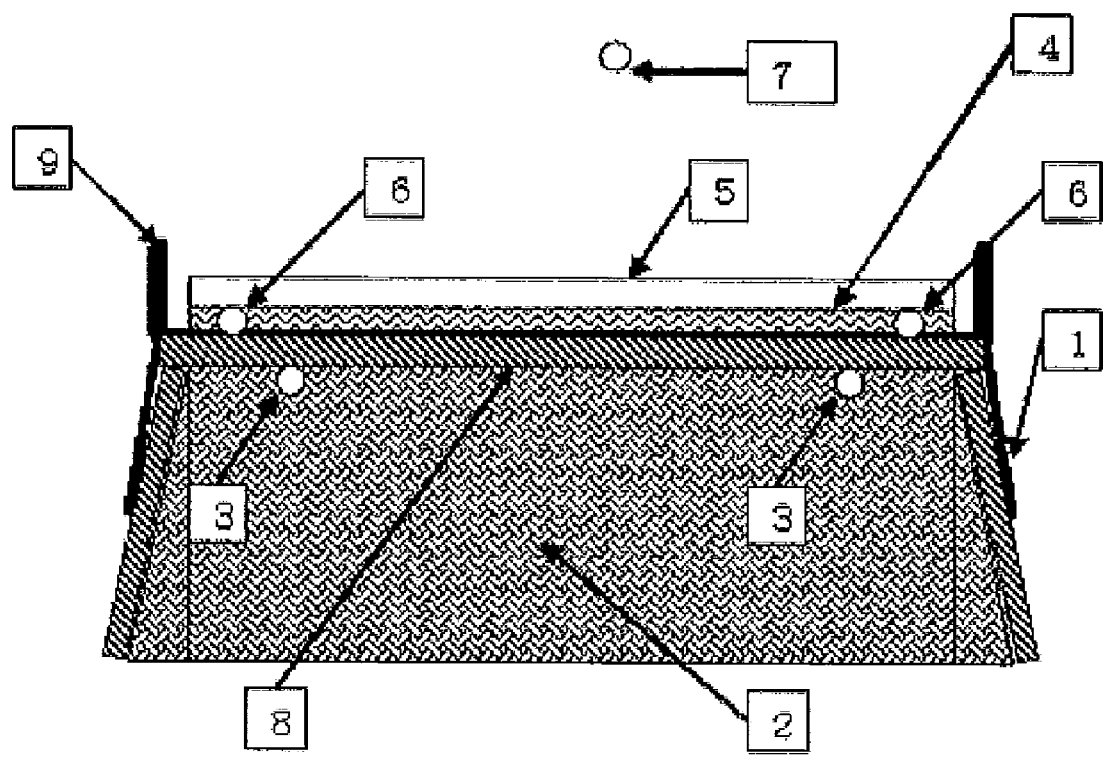

PLANT CULTIVATION SYSTEM

FIELD OF THE INVENTION

The present invention relates to a plant cultivation system. Particularly, the present invention is concerned with a plant cultivation system which employs a film capable of substantially integrating with plant roots. More particularly, the present invention is concerned with a plant cultivation system which is capable of feeding water or a nutrient fluid for cultivating a plant in the absence of a hydroponic tank for accommodating water or a nutrient fluid and cultivating a plant therein.

According to the present invention, a conventional hydroponic tank (used for accommodating water or a nutrient fluid and cultivating a plant therein) is not necessary for cultivating a plant and, therefore, the present invention is capable of saving material costs for the hydroponic tank.

Further, when a hydroponic tank is used, the hydroponic tank needs to be installed horizontally without inclination, which requires a large amount of cost. Such a cost is unnecessary in the present invention and, therefore, the cost of the equipment becomes low.

In the present invention, for maintaining a plant separated from ground soil which is used in a soil cultivation or a drip fertigation, a water impermeable material alone or a water impermeable material having a water absorbing material placed thereon is disposed on the ground soil, whereupon a nonporous hydrophilic film is disposed, to thereby form the plant cultivation system of the present invention on the ground soil. By growing a plant on the nonporous hydrophilic film of the above-mentioned plant cultivation system, it becomes possible to prevent the occurrence of problems accompanying the conventional soil cultivation and drip fertigation, namely plant contamination with microorganisms (such as nematodes), bacteria, viruses and the like in soil, which are causatives of the soil sickness accompanying sequential cropping; plant contamination with residual agrochemicals in soil; plant growth inhibition caused by salts accumulated at the surface of soil; and groundwater contamination caused by leaching out of fertilizers.

The present invention is capable of solving the above-mentioned problems which are caused by the direct contact between plant roots and ground soil. Further, since the plant cultivation system of the present invention requires only a very small amount of water and fertilizers, it becomes possible to drastically decrease the costs for growing a plant.

In addition, quality of the cultivated plant can be easily improved by growing the plant under water-suppressed conditions using the plant cultivation system of the present invention.

By the use of the plant cultivation system of the present invention, it also becomes possible to decrease the nitrate nitrogen contained in a plant which is nowadays considered problematic.

PRIOR ART

Conventionally, a wide variety of plants have been cultivated outdoors by field cultivation or indoors by greenhouse cultivation, utilizing natural conditions (such as sunlight, soil and rain). In both of the field cultivation and the greenhouse cultivation, the soil continues from the surface of the ground to the deep part of the earth. Therefore, in the case of propagation of harmful microorganisms (such as nematodes) and bacteria in soil which are major causatives of the soil sickness accompanying sequential cropping, it becomes necessary to either sterilize the soil or perform the so-called soil exchange in which the soil is changed with a large amount of uncontaminated soil brought from another place. A representative method for sterilizing soil is fumigation, but total ban on the use of methyl bromide for fumigation has made the soil sterilization difficult. Further, a large-scale soil exchange is substantially impossible from economical and physical viewpoints.

Further, organophosphorus agrochemicals which had been used in a large amount in the past have been contaminating ground soil, and contamination of agricultural crops with such agrochemicals has become a serious problem. Organophosphorus agrochemicals are difficult to decompose and detoxify. Therefore, a large-scale soil exchange is also necessary for solving this problem.

In a conventional fertilization method, a large amount of a fertilizer is applied to the ground as an basal fertilization and, then, during the cultivation of a plant, a fertilizer in an amount equal to 1- to 2-week dose is given at once as an additional fertilization. Such a conventional fertilization method is impractical in view of the reality that only a small amount of a fertilizer is absorbed by a young plant, and the amount of absorption increases with the growth of the plant. Therefore, the conventional fertilization method is not only inefficient but also causes salt accumulation in the soil.

Moisture contained in soil (especially, soil of a greenhouse) migrates upwardly from the lower part to upper part of the soil. During irrigation, fertilizer components are transiently carried down with water by gravity, but after the termination of irrigation, water again migrates towards the surface of the soil and salts are carried toward the surface of the soil by the migrating water. At the surface of the soil, only water is lost by evaporation. Repetition of such process leads to the accumulation of salts at the surface of the soil. In general, the larger the excess amount of salts present in a cultivation environment, the higher the level of salt accumulation, and the accumulated salts cause the growth inhibition of a plant. Conditions of such soil are very similar to those of desert soil where rainfalls are extremely scarce. The only way to improve such conditions is to either wash away the accumulated salts using a large amount of water or perform a large-scale soil exchange, both of which require large costs.

The above-mentioned inefficient fertilization also causes groundwater contamination. When fertilizers are used in an appropriate amount, the fertilizers, especially nitrogen fertilizers, are decomposed by microorganisms in the soil, wherein the fertilizers are oxidized in the following order:

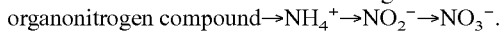
organonitrogen compound→$NH_4^+$→$NO_2^-$→$NO_3^-$.

However, when fertilizers are used in an excess amount or when the activity of nitrifying bacteria in the soil is weak, the above-mentioned oxidation process does not proceed so that $NH_4^+$ and $NO_2^-$ are excessively accumulated in the soil. $NH_4^+$ ions are adsorbed to the surface of negatively charged soil colloids, whereas $NO_2^-$ ions are not adsorbed to the soil but, instead, leach out of the soil and cause groundwater contamination.

Irrigation also poses the following problems. Irrigation of a plant is performed once in several days using a large amount of water, and the soil tends to become too moist immediately after the irrigation, but becomes dry just before the next irrigation. Thus, the water stress applied to the plant is difficult to control and, therefore, a high quality plant, such as a plant having high sugar content, is difficult to produce.

On the other hand, there is known a cultivation method called "drip fertigation" which exploits the advantages of soil cultivation. In this method, only fertilizer components required by the plant are given to the plant in an appropriate amount only when necessary. The drip fertigation is an irrigation and fertilization technique which involves disposing a drip tube on soil and feeding a nutrient fluid from a fluid feeding facility while performing a real-time measurement of the contents of a fertilizer and moisture in the soil, wherein the nutrient fluid contains appropriate amounts of not only nitrogen, phosphoric acid and potassium, but also micronutrient components (such as calcium) required by the plant. The basic features of drip fertigation are as follows.

1) No basal fertilizer is used (however, organic materials and soil conditioners may be applied for maintaining and improving physiochemical properties of and microorganism content of the soil). 2) Irrigation and fertilization are performed every day. 3) Appropriate irrigation and fertilization are performed based on the results of measurements of the nutrient content and the moisture content. 4) Use is made of a fertilizer which has a composition matching the nutrient absorption ratio of the plant and which does not contain unnecessary components. 5) Use is made of a liquid fertilizer blender which is capable of accurately measuring and blending liquid fertilizer components and easily changing the blending ratio of the liquid fertilizer components. 6) A flow meter is provided for recording the amount of irrigation and fertilization. 7) Use is made of an irrigation tube (such as the so-called "drip tube") which is capable of uniformly irrigating the whole field.

As explained above, contrary to the soil cultivation, the drip fertigation reduces the amounts of the fertilizer and water and, therefore, ameliorates the growth arrests caused by salts accumulated at the surface of the soil. Further, the drip fertigation is advantageous for reducing the groundwater contamination caused by excessive fertilization. However, the drip fertigation is not useful for preventing the soil sickness accompanying sequential cropping which is caused by the direct contact between the plant roots and the soil, and the agrochemical contamination caused by residual agrochemicals in the soil.

Non-patent document 1: "Youeki Dokou Saibai no Riron to Jissai (Theory and Practice of Drip Fertigation)", pages 2-18; edited by Hiroshi Aoki, Kenji Umezu and Shinichi Ono; published by Seibundo Shinkosha in June 2001.

For solving the above-mentioned problems accompanying the conventional soil cultivation and drip ferligation, there has been developed a cultivation system called "nutrient fluid cultivation" or "hydroponics". In the nutrient fluid cultivation, ground and a plant are separated by a hydroponic tank (bed) for storing a nutrient fluid therein and, therefore, this system is substantially free from the problems accompanying the soil cultivation and the drip fertigation, namely the contamination of the soil with the nutrient fluid and the infection of the plant due to the contaminated soil.

However, the nutrient fluid cultivation is disadvantageous not only in that it requires a hydroponic tank (bed) and bed supports which per se are expensive, but also in that the hydroponic tank needs to be installed horizontally without inclination, which requires a large amount of cost.

Further, since plant roots are directly immersed in a nutrient fluid, contamination of the nutrient fluid with bacteria, viruses and the like easily results in contamination of the plant. Therefore, this cultivation system requires the use of an expensive facility for circulating, sterilizing and filtering the nutrient fluid. Further, constant immersion of plant roots in the nutrient fluid results in lack of water stress, which causes the lowering of the nutritive value and flavor of the cultivated plant. In other words, this system is accompanied by a difficulty in producing a high quality plant, which is a fatal problem.

Further, as a problem common to the agricultural productions by the nutrient fluid cultivation utilizing a large amount of nutrient fluid for cultivating a plant within a short period of time, the soil cultivation accompanied by large amounts of fertilization and irrigation, and the drip fertigation, there can be mentioned a health hazard problem caused by nitrate nitrogen accumulated in a high concentration in plants, especially leaf vegetables, such as spinach and salad leaf.

Salad leaf, spinach and the like may contain high concentrations of nitrates in petioles which are edible parts thereof. A nitrate is converted into a nitrite upon reaction with saliva, which nitrite in turn is converted into a carcinogenic nitrosamine during the digestion process. Therefore, the nitrate content of vegetables is becoming one of the important criteria for quality of vegetables, and there is a demand for vegetables having a low nitrate content.

DISCLOSURE OF THE INVENTION

Problems to be Solved by the Invention

The task of the present invention is to provide a plant cultivation system which is free from the above-mentioned problems accompanying the nutrient fluid cultivation, the soil cultivation and the drip fertigation.

Means to Solve the Problems

In this situation, the present inventors have made extensive and intensive studies with a view toward solving the above-mentioned problems. As a result, it has unexpectedly been found that the above-mentioned problems can be solved by an inexpensive cultivation system which comprises a water impermeable material, a nonporous hydrophilic film, a water absorbing material disposed between the water impermeable material and the nonporous hydrophilic film, a means for supplying water or a nutrient fluid to the water absorbing material, and a means for feeding water or a nutrient fluid to the upper side of the nonporous hydrophilic film, wherein the system does not use a hydroponic tank used in a nutrient fluid cultivation and, hence, can dispense with an expensive construction work for installing the hydroponic tank.

In one embodiment of the present invention, the water impermeable material of the plant cultivation system is disposed on ground soil for maintaining a plant separated from the soil, and an irrigation means is provided so as to feed water or a nutrient fluid to the nonporous hydrophilic film through a water absorbing material disposed on the water impermeable material. The system of this embodiment is capable of freeing plant roots from the problems accompanying the conventional soil cultivation and the conventional drip fertigation, namely the soil sickness accompanying the sequential cropping which is caused by pathogenic bacteria and nematodes in the soil.

The plant cultivation system of the present invention is also advantageous in that, since the roots of plants being cultivated by the system of the present invention are maintained to be separated from the ground soil by the above-mentioned water impermeable material and the nonporous hydrophilic film, it becomes possible to prevent the contamination of the plants with residual agrochemicals and the like which are present in the ground soil.

The plant cultivation system of the present invention has still another advantage in that the leakage of fertilizers and water into the ground soil can be prevented by the above-mentioned water impermeable material, thereby preventing the accumulation of salts in the soil and the leaching out of the fertilizers from the system.

The plant cultivation system of the present invention has still another advantage in that, by disposing a small amount of foreign soil on the nonporous hydrophilic film and effectively feeding small amounts of a fertilizer and water to the foreign soil, it becomes possible to economically produce a high quality plant by applying water stress to the plant.

The plant cultivation system of the present invention has still another advantage in that the plant cultivation system is capable of decreasing the nitrate nitrogen content of the cultivated plant bodies.

As a result of the intensive and extensive studies, the present inventors have found a novel phenomenon that plant roots can be substantially integrated with a nonporous hydrophilic film (for example, a polymer film). As a result of further studies on such a phenomenon, the present inventors have also found that the plant roots which are substantially integrated with the nonporous hydrophilic film are capable of absorbing, through the film, fertilizer components and water from a nutrient fluid which is in contact with the film, wherein the fertilizer components and water are absorbed in respective amounts necessary for plant growth. The present inventors have also found that, for absorbing the water and the fertilizer components through the film, a plant having its roots integrated with the film grows a vast amount of root hairs, and the root hairs enable an efficient absorption of water, fertilizer components, air and the like from the surroundings of the roots.

In addition, the present inventors have found that the feeding of water or a nutrient fluid to the nonporous hydrophilic film in the absence of a hydroponic tank (which is used for accommodating water or a nutrient fluid and cultivating a plant therein) is advantageous for achieving the tasks of the present invention. The present invention has been completed based on these novel findings.

The plant cultivation system of the present invention is based on the above-mentioned findings. Specifically, the system of the present invention has a characteristic that a plant body to be cultivated is placed on a nonporous hydrophilic film capable of substantially integrating with plant roots, wherein the nonporous hydrophilic film is disposed on a water impermeable material directly or through a water absorbing material disposed on the water impermeable material.

The present invention also provides a plant cultivation system, wherein water or a nutrient fluid is supplied by an irrigation means to the water absorbing material which is disposed between the water impermeable material and the nonporous hydrophilic film.

The present invention also provides a plant cultivation system, wherein a plant cultivation support and a plant body are disposed on or above the nonporous hydrophilic film.

The present invention also provides a plant cultivation system, wherein a plant body and a mulching film or mulching material which is impervious to water vapor are disposed on the nonporous hydrophilic film.

The present invention also provides a plant cultivation system, wherein, after the substantial integration of the plant roots with the nonporous hydrophilic film, water and/or a nutrient fluid is appropriately fed to the upper side of the nonporous hydrophilic film.

Effects of the Invention

The plant cultivation system having the above-mentioned construction does not need a hydroponic tank used in the conventional drip fertigation for storing a nutrient fluid and, hence, can dispense with an expensive construction work for installing the hydroponic tank. Thus, the present invention provides an economical plant cultivation system.

According to the present invention, the nonporous hydrophilic film (and the water impermeable material) maintains the plant roots separated from the ground soil to prevent the direct contact between the roots and the soil. Even when the soil is contaminated with pathogenic microorganisms and pathogenic bacteria, the microorganisms and bacteria cannot pass through the nonporous hydrophilic film (and the water impermeable material). Therefore, the nonporous hydrophilic film (and the water impermeable material) prevents the contact between the roots and the microorganisms and bacteria, so that the soil sickness accompanying the sequential cropping disorders can be avoided.

Further, even when the ground soil is contaminated by residual agrochemicals and the like, the system of the present invention is capable of reducing the contamination of a cultivated plant by maintaining the plant roots separated from the soil by the nonporous hydrophilic film (and the water impermeable material).

In the present invention, when the water impermeable material is disposed on the ground soil, the water impermeable material prevents the nutrient fluid and the like (fed to the water absorbing material disposed between the nonporous hydrophilic film and the water impermeable material) from migrating into the ground soil. Therefore, the system of the present invention not only prevents the salt accumulation and the groundwater contamination, but also lowers the cultivation costs by enabling an efficient use of precious water and reducing the amount of fertilizers used.

Further, even when salts are accumulated at the surface of the ground, the presence of the water impermeable material prevents the roots from being in a direct contact with the salts and, therefore, the accumulated salts has no serious influence on the plant growth.

In the plant cultivation system of the present invention, the water stress applied to the plant being cultivated can be very easily controlled by the nonporous hydrophilic film, thereby enabling the production of a high quality plant.

Further, in the present invention, the nitrogen nitrate content of the cultivated plant can be easily decreased to a large extent by either of the following methods:

a method which comprises feeding mainly water alone to the lower surface of the nonporous hydrophilic film and feeding a small amount of a nutrient fluid to the upper side of the nonporous hydrophilic film while precisely controlling the doses and timings of the feeding, and, in a later stage of cultivation, changing the nutrient fluid fed from the upper side to water alone; and a method which comprises feeding a nutrient fluid to the lower surface of the nonporous hydrophilic film, and feeding water alone to the upper side of the nonporous hydrophilic film.

In the system of the present invention, from the viewpoint of ease in controlling the feeding of water or a nutrient fluid to either the lower surface or upper side of the nonporous hydrophilic film, it is preferred to use the so-called "drip tube" for the feeding.

BEST MODE FOR CARRYING OUT THE INVENTION

Hereinbelow, the present invention will be explained in detail by making reference to the appended drawings. In the explanations below, each of the terms "part" and "%" represents a ratio based on mass, unless otherwise specified.

(Plant Cultivation System)

The plant cultivation system of the present invention is used for cultivating a plant on a nonporous hydrophilic film, and comprises a nonporous hydrophilic film and a means for feeding water or a nutrient fluid to the lower surface of the nonporous hydrophilic film in the absence of a hydroponic tank for accommodating water or a nutrient fluid and cultivating a plant therein.

FIG. 1 is a schematic cross-sectional view of an example of a basic embodiment of the plant cultivation system of the present invention. As apparent from FIG. 1, in this embodiment, nonporous hydrophilic film 1 for placing a plant body thereon is disposed on water impermeable material 2.

Other Embodiment 1

FIG. 2 is a schematic cross-sectional view of an example of another embodiment of the plant cultivation system of the present invention. As apparent from FIG. 2, in this embodiment, irrigation means 3 (e.g., a drip tube) and water absorbing material 8 (such as a nonwoven fabric) are disposed on the water impermeable material 2, whereupon the nonporous hydrophilic film 1 is disposed. The use of such irrigation means 3 is advantageous for effectively feeding a nutrient fluid to the nonporous hydrophilic film 1.

(Additional Components)

In the embodiment depicted in FIG. 2, if desired, plant cultivation support 4 (such as soil) and/or evaporation suppression material 5 (e.g., the below-mentioned mulching material) which is either impervious or semi-pervious to water vapor may be disposed on or above the nonporous hydrophilic film 1. The use of such evaporation suppression material 5 enables water vapor evaporating from the nonporous hydrophilic film 1 into the atmosphere to be condensed on the surface of the evaporation suppression material 5 or inside the plant cultivation support 4, thereby allowing the plant to utilize the water condensed from the water vapor. Further, disposition of the water absorbing material 8 (such as a nonwoven fabric) below the nonporous hydrophilic film 1 enables a uniform feeding of the nutrient fluid to the nonporous hydrophilic film 1.

Further, if desired, irrigation means 6 (e.g., a drip tube) for intermittently feeding water or a nutrient fluid may be disposed on or above the nonporous hydrophilic film 1. The disposition of such intermittent irrigation means 6 is advantageous for supplementing water or fertilizer components when there is a deficiency of water or fertilizer components taken in by the plant through the nonporous hydrophilic film.

In addition, if desired, mist spraying means 7 (e.g., a valve) for intermittently spraying water, a nutrient fluid or a diluted agrochemical solution may be provided above the cultivation region containing the nonporous hydrophilic film 1. The use of the mist spraying means 7 is advantageous in that it enables the automation of an intermittent spraying of: water for cooling, especially during summer seasons; a nutrient fluid for cooling the environment and for feeding fertilizer components in the form of a foliar spray; and water or a nutrient fluid containing an agrochemical for crop-dusting. The construction of the system depicted in FIG. 2 is substantially the same as that shown in FIG. 1 except for the additional features explained above.

Another Embodiment 2

FIG. 3 is a schematic cross-sectional view of an example of another embodiment of the plant cultivation system of the present invention. As apparent from FIG. 3, in this embodiment, water impermeable material 2 is placed on, for example, ground soil so as to form a ridge having a predetermined height on the ground soil. On such a ridge (formed by the water impermeable material 2) is placed nonporous hydrophilic film 1, wherein peripheral portions of the nonporous hydrophilic film 1 are folded downward so as to hang down along the sides of the ridge formed by the water impermeable material 2. For preventing the plant cultivation support 4 (for example, soil) disposed on the film 1 from falling off the ridge formed by the water impermeable material 2, retaining wall 9 for holding the plant cultivation support, namely a retaining wall made of a plastics material, wood or the like, is disposed on the film 1 such that a gap for flowing water is formed between the nonporous hydrophilic film 1 and the retaining wall 9. By the use of such a retaining wall, even when the system of the present invention is used outdoors without a rain shelter (such as a polytunnel), excess water can be removed from the upper side of the nonporous hydrophilic film 1 during the rain, thereby enabling cultivation under conditions which are similar to those inside a facility, such as a greenhouse. The construction of the system depicted in FIG. 3 is substantially the same as that shown in FIG. 2 except for the features explained above.

(Mulching Material)

In the present invention, the so-called "mulching" can be preferably used. The "mulching" means a material, such as a film, which is applied around the root, stem and the like of a plant for providing protection against heat, cold, dryness, etc. The use of such a mulching is advantageous for enhancing the effective use of water.

In the system of the present invention, water or a nutrient fluid migrates into the nonporous hydrophilic film 1 either from the upperside of the water impermeable material 2 or from the water absorbing material 8 disposed on the water impermeable material 2 and, then, the water or the nutrient fluid is absorbed by the plant roots which are integrated with the film 1. However, a part of the water or the nutrient fluid is likely to be lost by evaporation in the form of water vapor from the surface of the nonporous hydrophilic film 1. For suppressing as much as possible the water loss caused by the evaporation of water into the atmosphere, the surface of the film 1 (or the soil provided thereon as a plant cultivation support) may be covered with the mulching material 5. The covering with the mulching material 5 enables water vapor to be condensed on the surface of the mulching material 5 or in the plant cultivation support so that the plant can utilize the water condensed from the water vapor.

(Irrigation Means)

Irrigation means 3 and 6 (e.g., drip tubes) are capable of intermittently feeding water or a nutrient fluid in small doses to a plant cultivation support (such as a culture soil and ground soil), thus enabling the utilization of the buffering action of the soil in cultivation of a plant. The so-called "drip tube" which is an example of the irrigation means usable in the present invention was developed in Israel where water is precious, and can be used for feeding only minimum amounts of water and fertilizers required for plant growth by drip irrigation.

(Mist Spraying Means)

During greenhouse cultivation, shading and ventilation may be insufficient as countermeasures against high temperature during summer seasons, whereas the use of an air conditioner may increase the energy costs for cultivating a plant. For solving these problems, mist spraying means 7 may be provided to apply the so-called mist shower to the plant. The mist shower is a spray of atomized water composed of very small particles, which is useful for cooling of the air by removing heat of evaporation from the air. The mist spraying means can be used as not only a cooler, but also a device for foliar feeding and/or crop-dusting. The spraying of water containing fertilizers and/or agrochemicals by the mist spraying means may result in labor saving.

(Plant Cultivation System)

In the present invention, the plant cultivation system may have various structures, components and parts as long as the system has the above-mentioned construction. Hereinbelow, explanations are made on the preferred embodiments of the plant cultivation system which are advantageous for achieving the characteristic effects of the present invention, such as omission of costs for an expensive cultivation tank and supports thereof, and construction work for leveling the tank; prevention of the soil sickness accompanying sequential cropping, agrochemical contamination, groundwater contamination and salt accumulation at the surface of the ground; production of a high quality plant; and lowering of the nitrate nitrogen content of the plant.

(Preferred Plant Cultivation System 1)

Explanation is made by making reference to the schematic cross-sectional view shown in FIG. 2. In this embodiment, water or a nutrient fluid is fed from the irrigation means 3 (e.g., a drip tube) to the upper side of the water impermeable material 2 or to the water absorbing material 8 disposed on the water impermeable material 2, whereafter the water or the nutrient fluid migrates into the nonporous hydrophilic film 1 disposed on either the water impermeable material 2 or the water absorbing material 8. Plant roots grow by absorbing the water or the nutrient fluid which has migrated into the film 1.

If desired, irrigation means 6 (e.g., a drip tube) for intermittently feeding water or a nutrient fluid may be disposed on or above the nonporous hydrophilic film 1. The use of irrigation means 6 enables the feeding of a controlled amount of water or a nutrient fluid to the plant cultivation support 4 (such as soil) and is advantageous for supplementing water or a fertilizer component when there is a deficiency of water or fertilizer component taken in by the plant through the film 1.

Further, evaporation suppression material 5 (e.g., a mulching material) which is either impervious or semi-pervious to water vapor may be disposed in the plant cultivation system. The use of such evaporation suppression material 5 enables water vapor evaporating from the nonporous hydrophilic film 1 into the atmosphere to be condensed either on the surface of the evaporation suppression material 5 or inside the plant cultivation support 4 (e.g., soil), thereby allowing the plant to utilize the water condensed from the water vapor.

In addition, if desired, mist spraying means 7 (e.g., a valve) may be provided above the nonporous hydrophilic film 1 for intermittently spraying water, a nutrient fluid or a diluted agrochemical solution. By the use of such mist spraying means 7, it becomes possible to automate an intermittent spraying of: water for cooling, especially during summer seasons; a nutrient fluid for cooling the environment and for feeding fertilizer components in the form of a foliar spray; and water or a nutrient fluid containing an agrochemical for crop-dusting.

(Preferred Plant Cultivation System 2)

In the present invention, for reducing the amount of a specific unfavorable component (such as nitrate nitrogen) contained in a plant, it is basically preferred to feed only water to the upper side of the nonporous hydrophilic film 1 (so as to prevent the accumulation of nutrient components). However, for promoting the "integration" of the roots with the film 1 which is defined below, it is preferred to feed a nutrient fluid to the lower surface of the film 1.

When an excess amount of water is fed to the upper side of the film 1 before the completion of the "integration" of the roots and the film 1, the plant absorbs water from the upper side of the film which is easier to absorb, thereby reducing the necessity of absorbing water from the lower surface of the film. As a result, the integration of the roots with the film tends to become difficult. Therefore, until the roots have been integrated with the film 1, it is preferred to refrain from feeding an excess amount of water to the upper side of the film.

On the other hand, after the integration of the roots with the film, the water/nutrient fluid may be fed to the upper side of the film when appropriate.

Advantages of the Present Invention

By the use of the plant cultivation system of the present invention having the above-mentioned construction, even in the absence of an expensive hydroponic tank and supports thereof which are necessary for the conventional nutrient fluid cultivation and which requires a cumbersome construction work for leveling the tank, it becomes possible to prevent the soil sickness accompanying sequential cropping caused by pathogenic bacteria and nematodes in the soil and plant contamination by residual agrochemicals in the soil.

Further, even when salts are accumulated at the surface of the soil, the salts will not influence the growth of the plant because the soil does not get in direct contact with the roots. In addition, in the system of the present invention, ground soil is covered with the water impermeable material 2 which prevents water and a nutrient fluid fed to the upper side of the film from leaking out into the soil. Therefore, it becomes possible to prevent the contamination of soil and groundwater with the fertilizers. Further, since water supply to the plant can be easily controlled by the non-porous hydrophilic film, it becomes possible to improve the quality of the plant by enriching the nutritive value (e.g., sugar content) thereof.

In the conventional soil cultivation and drip fertigation, fertilizer components fed to ground soil spread out through the ground. Therefore, even when a nutrient fluid fed to the plant is changed to water at a later stage of the cultivation period, it is difficult to decrease the fertilizer concentration of the soil and decrease the amount of nitrate nitrogen remaining in the plant body. Further, from a practical point of view, it is difficult to change the nutrient fluid in the tank to water during the cultivation of a plant.

On the other hand, the plant cultivation system of the present invention has the following advantages: only a small amount of foreign soil needs to be used on the nonporous hydrophilic film 1; only a small amount of nutrient fluid or water needs to be fed to the upper side of the film; the nutrient fluid can be changed to water during the cultivation of a plant; and the amount of nitrate nitrogen remaining in the plant can be very easily decreased.

(Feature of Each Part of the System)

Hereinbelow, explanation is made on the features of parts of the plant cultivation system of the present invention. With respect to such features (or functions), if necessary, reference can be made to the "Detailed description of the invention" and "Examples" of WO 2004/064499 which is a patent application of the present inventors.

(Film 1)

The film 1 used in the plant cultivation system of the present invention is characterized in that "it is capable of substantially integrating with the plant roots". In the present invention, whether or not a film is capable of "substantially integrating with the plant roots" can be determined by, for example, the below-mentioned "integration test". According to the findings of the present inventors, it is preferred that the film capable of "substantially integrating with the plant roots" has a specific balance between water permeability and ion permeability (water permeability/ion permeability balance) which is explained below. It is presumed that, when the film has such specific water permeability/ion permeability balance, an excellent balance between water permeability and nutrient permeability which is most appropriate for the growth of a cultivated plant (especially the growth of the roots) can be easily accomplished, and such an excellent balance enables the substantial integration of the roots with the film.

In use of the system of the present invention, a plant absorbs a fertilizer in the form of ions through the film 1, and the amount of fertilizer components fed to the plant are likely to be influenced by the salt (ion) permeability of the film. It is preferred to use a film having an ion permeability of 4.5 dS/m or less in terms of an electrical conductivity (EC) difference in a water/saline solution system. The EC difference is determined by contacting water with a saline solution through the film (wherein the water and the saline solution are placed in respective compartments which are partitioned by the film), and measuring the EC of each of the water and the saline solution 4 days after the start of the contact, and calculating the difference in EC between the water and the saline solution. The use of such a film enables an appropriate feeding of water or a fertilizer solution to the roots, thereby easily promoting the integration of the roots with the film.

Film 1 having a water impermeability of 10 cm or more, in terms of water pressure resistance, is preferably used in the present invention. This is because the use of such a film promotes the integration of the roots with the film. Further, the use of such a film is advantageous for easily providing sufficient oxygen supply to the roots and for preventing the contamination by pathogenic bacteria.

(Water Pressure Resistance)

The water pressure resistance of a film can be measured according to JIS L1092 (method B). It is preferred that the water pressure resistance of the film 1 used in the present invention is 10 cm or more, more advantageously 20 cm or more, and still more advantageously 30 cm or more. The film 1 having the above-mentioned characteristics must be non-porous and hydrophilic.

(Water/Ion Permeability)

In the present invention, it is preferred that the above-mentioned film 1 exhibits an electrical conductivity (EC) difference of 4.5 dS/m or less as determined between water and a saline solution, wherein the EC difference is determined by a method comprising contacting the water with the saline solution (0.5% by weight) through the film, and measuring the EC of each of the water and the saline solution at the cultivation temperature 4 days after the start of the contact, and calculating the difference in EC between the water and the saline solution. More preferably, the EC difference is 3.5 dS/m or less, and most preferably 2.0 dS/m or less. The electrical conductivity difference is preferably determined in the following manner.

<Experimental Equipments and the Like>

Unless otherwise specified, experimental equipments, apparatuses and materials used in the below-mentioned experiments (including Examples) are those described at the beginning of the section "Examples" described below.

<Method for Measuring Electric Conductivity>

Since a fertilizer is usually absorbed in the form of ions, it is preferred to determine the amount of salts (or ions) dissolved in a solution. The ion concentration is determined in terms of an electrical conductivity (EC). EC is also called "specific conductivity" and represents an electrical conductivity between two electrodes, each having a cross sectional area of 1 cm$^2$, which are separated at a distance of 1 cm from each other. The unit used is siemens (S), and the EC value of a solution is expressed in terms of S/cm. However, since the EC of a fertilizer solution is small, unit "mS/cm" (which is $\frac{1}{1000}$ of S/cm) is used in the present specification (unit used in accordance with the International System of Units is dS/m, wherein d represents "deci-"). In an actual measurement, a small amount of a sample (for example, a solution) is placed, using a dropper, on a measuring portion (sensor portion) of an electrical conductivity meter for measuring the electrical conductivity defined above, to thereby measure the electrical conductivity of the sample.

<Salt/Water Permeability Test of Film 1>

Ten (10) grams of a commercially available table salt (for example, "Hakata no Sio (Salt from Hakata)" described below) is dissolved in 2,000 ml of water to prepare a 0.5% saline solution (EC: about 9 dS/m). The measurement is performed using a "sieve basket-bowl set". The sieve basket-bowl set comprises a sieve basket and a bowl, wherein the sieve basket is accommodated in the bowl. Film 1 to be tested (size: 200 to 260 mm×200 to 260 mm) is placed on the sieve basket of the sieve basket-bowl set, and 150 g of water is poured onto the film on the sieve basket. On the other hand, 150 g of the saline solution prepared above is placed in the bowl of the sieve basket-bowl set. The sieve basket containing the film and water is accommodated in the bowl containing the saline solution, and the whole of the resultant system is wrapped with a resin film for wrapping food (a polyvinylidene chloride film, trade name: Saran Wrap, manufactured and sold by Asahi Kasei Corporation) to prevent the evaporation of water from the system. The resultant system is allowed to stand still at room temperature, and the EC values of the water and the saline solution are measured every 24 hours.

In the present invention, for facilitating the absorption of nutrient (organic matter) by plant roots through film 1, it is preferred that the film 1 also exhibits a specific level of glucose permeability. The glucose permeability can be appropriately evaluated by the following water/glucose solution permeability test. In the present invention, it is preferred that the above-mentioned film exhibits a Brix concentration (%) difference of 4 or less as determined between water and a glucose solution at the cultivation temperature, wherein the Brix concentration (%) difference is determined by a method comprising contacting water with the glucose solution through the film (wherein the water and the glucose solution are placed in respective compartments which are separated by the film), measuring the Brix concentration (%) of each of the water and the glucose solution three days (72 hours) after the start of the contact, and calculating the difference in Brix concentration (%) between the water and the glucose solution. The Brix concentration (%) difference is more preferably 3 or less, still more preferably 2 or less, especially preferably 1.5 or less.

<Water/Glucose Solution Permeability Test of Film 1>

A 5% glucose solution is prepared using a commercially available glucose (dextrose). A "sieve basket-bowl set" which is the same as that used in the above-mentioned salt/water permeability test is used. Film 1 to be tested (size: 200 to 260 mm×200 to 260 mm) is placed in the sieve basket of the sieve basket-bowl set, and 150 g of water is poured onto the film. On the other hand, 150 g of the glucose solution prepared above is placed in the bowl of the sieve basket-bowl set. The sieve basket containing the film and water is accommodated in the bowl containing the glucose solution, and the whole of the resultant system is wrapped with a resin film for wrapping food (a polyvinylidene chloride film, trade name: Saran Wrap, manufactured and sold by Asahi Kasei Corporation) to prevent the evaporation of water from the system. The resultant system is allowed to stand still at room temperature, and the sugar contents (Brix concentration (%)) of the water and the glucose solution are measured every 24 hours using a Brix meter.

(Integration of Roots with Film 1)

A test is performed under the conditions (using vermiculite) mentioned in Example 2 below. Specifically, a plant growth test is performed for 35 days using two sunny lettuce seedlings (each having at least 1 main leaf), thereby obtaining a plants/film 1 hybrid system. The plants are removed from the obtained plants/film 1 hybrid system by cutting the stems and the leaves near the roots of the plants. Test specimens are cut out from the film having the roots adhered thereto so that the width of each test specimen is 5 cm (and the length is about 20 cm) with the stem of the plant being positioned around the center of each test specimen.

A commercially available clip is attached to a hook hanging from the spring of the spring type balance, and one end of the test specimen obtained above is gripped by the clip, followed by recording the weight (A grams) (corresponding to the tare weight of the test specimen) indicated by the spring type balance. Subsequently, the stem of the plant at the center of the test specimen is held by hand and gently pulled downward to detach (or break away) the roots from the film, while recording the weight (B grams) (corresponding to the applied load) indicated by the spring type balance. The tare weight is subtracted from this value (that is, B grams minus A grams) to thereby obtain a peeling strength for a width of 5 cm.

In the present invention, it is advantageous to use film 1 which exhibits a peeling strength of 10 g or more with respect to the roots of the plant. The peeling strength of the film is preferably 30 g or more, and more preferably 100 g or more.

(Materials of Film 1)

In the present invention, there is no particular limitation with respect to the materials usable as the film 1 and any conventional materials can be used as long as the film is capable of "substantially integrating with the roots". The film may be a material which is generally referred to as a "membrane". Specific examples of materials of film 1 include hydrophilic materials, such as a polyvinyl alcohol (PVA), a cellophane, a cellulose acetate, a cellulose nitrate, an ethyl cellulose and a polyester.

There is no particular limitation with respect to the thickness of the film 1, and it is generally about 300 μm or less, preferably about 5 μm to 200 μm, more preferably about 20 μm to 100 μm.

(Plant Cultivation Support)

As described above, in the present invention, any of conventional soils or culture media can be used as the plant cultivation support. As such soils or culture media, there can be mentioned, for example, a soil for use in soil cultivation and a culture medium for use in hydroponic cultivation.

Examples of inorganic materials usable as the plant cultivation support include: natural materials, such as sand, gravel and pumice sand; and processed materials (e.g., a high temperature calcination product), such as a rock fiber, vermiculite, perlite, ceramics and a carbonized rice hull. Examples of organic materials usable as the plant cultivation support include natural materials, such as peat moss, coconut fiber, bark medium, hull, peat (Nitan) and peat grass (Sotan); and synthetic materials, such as particulate phenol resin. The above-mentioned materials can be used individually or in any combination. Further, woven or nonwoven fabrics made of synthetic fibers can also be used. To the cultivation support explained above, a small amount of a nutrient (e.g., a fertilizer and micronutrient components) may be added. With respect to such a nutrient added to the cultivation support, according to the finding of the present inventors, it is preferred to add a nutrient to the plant cultivation support on the film 1 in such an amount as required until the roots of a plant grows to a degree such that the plant is capable of absorbing water or a nutrient fluid through the film, in other words, until the roots integrate with the film.

(Nutrient Fluid)

With respect to the nutrient fluid (or the fertilizer solution) used in the present invention, there is no particular limitation. For example, use can be made of any nutrient fluids which have been used in the conventional soil cultivation and nutrient fluid cultivation.

As inorganic components contained in water or a nutrient fluid which are generally known as essential components for plant growth, there can be mentioned nitrogen (N), phosphorous (P), potassium (K), calcium (Ca), magnesium (Mg), and sulfur (S) which are major components; and iron (Fe), manganese (Mn), boron (B), copper (Cu), zinc (Zn) and molybdenum (Mo) which are micronutrient components. In addition, there can be mentioned silicon (Si), chlorine (Cl), aluminum (Al), sodium (Na) and the like which are subsidiary components. If desired, any of other physiologically active substances may be added as long as the substances do not substantially inhibit the effect of the present invention. Further, the water or nutrient fluid may be supplemented with sugars, such as glucose (dextrose), and amino acids.

(Water Impermeable Material)

There is no particular limitation with respect to the water impermeable material as long as it is impermeable to water. Examples of water impermeable material include a synthetic resin, wood, metal and ceramics, which may be in the form of a film, a sheet, a plate or a box.

(Water Absorbing Material)

The water absorbing material has the function of supplying water or a nutrient fluid to the film 1 and, basically, there is no particular limitation with respect to the water absorbing material as long as it is capable of absorbing and retaining water therein. For example, use can be made of a sponge or nonwoven fabric made of a synthetic resin; a woven fabric; fibers, chips and powder of plant origin; and other materials generally used as a plant cultivation support, such as peat moss and moss.

Hereinbelow, the present invention will be explained in more detail by making reference to the following Examples.

EXAMPLES

Example 1

1) Test Method

A plant cultivation system was prepared in a simplified greenhouse as follows. A polyethylene film (manufactured and sold by Okura Industrial Co., Ltd.) having a thickness of 50 μm, a width of 1 m and a length of 1 m was spread out on the soil inside the greenhouse, and a capillary sheet (SR-130, manufactured and sold by Mebiol Inc.) having a width of 60 cm and a length of 1 m was disposed on the polyethylene film. A total of 10 nozzles extending from an automated irrigation device were placed on the surface of the capillary sheet, wherein 5 nozzles were positioned at each opposite side of the capillary sheet with 20 cm intervals. Then, a nonporous hydrophilic film (Hymec film having a thickness of 65 μm, manufactured and sold by Mebiol Inc.) was disposed on the capillary sheet having the nozzles disposed thereon. On the nonporous hydrophilic film was disposed, as a culture soil, Super Mix A (manufactured and sold by Sakata Seed Co.) to a thickness of 2 cm, and a total of 10 nozzles extending from another automated irrigation device were also placed on the culture soil. The culture soil was covered with a mulching film which is Silver Mulch 30 μm (manufactured and sold by TOKANKO-SAN CO, LTD.) On the mulching film was made six X-shaped through-cuts in a line with 15 cm intervals for planting plants therethrough, and the through-cuts were covered with a culture soil, thereby obtaining a cultivation system.

As a comparative experiment, a hydroponic tank (inner width: 45 cm, length: 1 m, and depth: 12 to 18 cm) filled with 30 L of a nutrient fluid was installed on the ground and a nonporous hydrophilic film (Hymec film having a thickness of 65 μm, manufactured and sold by Mebiol Inc.) was disposed thereon. On the nonporous hydrophilic film was disposed, as a culture soil, Super Mix A (manufactured and sold by Sakata Seed Co.) to a thickness of 2 cm, and a total of 10 nozzles of an automated irrigation device were placed on the culture soil. The culture soil was covered with a mulching film which is Silver Mulch 30 μm (manufactured and sold by TOKANKO-SAN CO, LTD.). On the mulching film was made six X-shaped through-cuts in a line with 15 cm intervals for planting plants therethrough, and the through-cuts were covered with a culture soil, thereby obtaining a cultivation system.

Seeds of sunny lettuce "Red Wave" (manufactured and sold by Sakata Seed Co.) were cultivated in a cell tray until the seeds grew into seedlings having 1 to 2 main leaves. A total of six seedlings were planted through the above-mentioned six-through cuts of the mulching film, respectively, and the cultivation of the planted seedlings was initiated after the primary irrigation.

Automated irrigation device: Timer for automated watering, EY4200-H (manufactured and sold by Panasonic Corporation).

Cultivation method: After planting the seedlings, a nutrient fluid in an amount of 200 ml to 300 ml per day was fed from the nozzles of the automated irrigation device to the capillary sheet disposed below the nonporous hydrophilic film. In this Example including the comparative experiment, the irrigation (feeding of a nutrient fluid) to the upper side of the nonporous hydrophilic film was performed using the automated irrigation device. The amount of irrigation (nutrient fluid fed) to the upper side of the film was approximately 20 ml per seedling. Cultivation period was 1 month from the planting of the seedlings.

Nutrient fluid: The EC of the nutrient fluid was 1.2 dS/m. The nutrient fluid was a mixture of 0.6 g/L of Otsuka House No. 1 and 0.9 g/L of Otsuka House No. 2, with which 0.03 g/L of Otsuka House No. 5 had been blended.

2) Test Results

As apparent from Table 1 below, the total weight of six sunny lettuces after 1-month cultivation was 143.6 g when a water absorbing material was provided under the nonporous hydrophilic film. On the other hand, the total weight of the sunny lettuces was 163.5 g in the comparative experiment which used a hydroponic tank.

TABLE 1

| | Amount of nutrient fluid provided below the film (L) | Amount of irrigation to upper side of the film (L) | Total weight (g) of leaves and stem (6 plant bodies) |
|---|---|---|---|
| Use of water absorbing material (present invention) | 8 | 3.5 | 143.6 |
| Use of a tank (comparative experiment) | 30 | 3.5 | 163.5 |

The amount of harvest in the plant cultivation system of the present invention was approximately 10% lower than that in the comparative experiment using a hydroponic tank, but the amount of nutrient fluid provided below the nonporous hydrophilic film was about ¼ of the amount used in the comparative experiment.

Experimental methods other than those mentioned above are explained below.

<Measurement of pH>

Measurement of pH was performed using the below-mentioned pH meter. After calibrating the sensor portion of the pH meter with a standard solution (pH 7.0), the sensor portion was dipped in a solution to be measured. The main body of the pH meter was gently shaken and left still until a steady value was displayed on the LCD (liquid crystal display) panel of the pH meter. The pH value of the solution was obtained by reading the steady value displayed on the LCD panel of the pH meter.

<Measurement of Brix Concentration (%)>

Brix concentration (%) was measured using the below-mentioned Brix meter (refractometer). A part of the solution to be measured was sampled using a dropper and dropped on the prism portion of the Brix meter. The Brix concentration value of the solution was obtained by reading the value displayed on the LCD of the Brix meter.

<Experimental Equipments and the Like>

1. Experimental Equipments and Apparatuses

1) Sieve basket-bowl set: Radius of the sieve basket was 6.4 cm (the area of the bottom surface was about 130 $cm^2$);

2) Styrofoam box: Size: 55×32×15 cm;

3) Electric pan scale: Max. 1 kg, manufactured and sold by Tanita Corporation;

4) Spring type balance: Max. 500 g, manufactured and sold by Kamoshita Seikojyo K.K.;

5) Post scale: Postman 100, manufactured and sold by Maruzen Co., Ltd.;

6) Conductometer: Twin Cond B-173, manufactured and sold by Horiba Ltd.;

7) pH meter: pH pal TRANS Instruments, manufactured and sold by Gunze Sangyo Inc., and compact pH meter (Twin pH) B-212, manufactured and sold by HORIBA, Ltd.; and 8) Brix meter (refractometer): PR201, manufactured and sold by Atago, Co., Ltd.

2. Materials Used (Soils):

1) Super Mix A: Culture soil having a water content of about 70% and containing trace amounts of fertilizers, manufactured and sold by Sakata Seed Corporation;

2) Rock fiber: granular cotton 66R (fine particles) for agricultural use, manufactured and sold by Nitto Boseki Co., Ltd.; and 3) Vermiculite: Type GS, manufactured and sold by Nittai Corporation.
(Films):
4) Polyvinyl alcohol (PVA) film: thickness: 40 μm, manufactured and sold by Aicello Chemical Co., Ltd.;
5) Biaxially oriented PVA film: BOVLON, manufactured and sold by Nippon Synthetic Chemical Industry Co., Ltd.;
6) Hydrophilic polyester film: thickness: 12 μm, manufactured and sold by DuPont;
7) Permeable cellophane (for smoke drying): manufactured and sold by Tokyu Hands Inc.;
8) Cellophane: thickness: 35 μm, manufactured and sold by FUTAMURA CHEMICAL CO., LTD;
9) Microporous polypropylene film: PH-35, manufactured and sold by Tokuyama Corp.; and
10) Nonwoven fabric: Shaleria (nonwoven fabric made of ultrafine fibers), manufactured and sold by Asahi Kasei Corporation.
(Seeds for Preparing Seedlings)
11) Seeds of sunny lettuce: "Red Fire", manufactured and sold by Takii & Co., Ltd.
(Fertilizers)
12) Hyponex stock solution: manufactured and sold by HYPONeX JAPAN CORP., LTD; and
13) Otsuka House Nos. 1, 2 and 5: all manufactured and sold by Otsuka Chemical Co., Ltd.
(Others)
14) "Hakata no Sio (Salt of Hakata)": manufactured and sold by Hakata Engyo Co., Ltd.; and
15) Glucose: Glucose 100, manufactured and sold by E. S. NA.

Example 2

Integration of Roots with a Film

Effects of a fertilizer concentration on the integration of the roots with a film were examined. Each of a 100-fold diluted Hyponex solution, a 1000-fold diluted Hyponex solution and water (tap water) was used as a nutrient fluid, and the results were compared.

On a nonporous hydrophilic film (PVA film) having a size of about 20 cm×20 cm was disposed about 300 ml of either vermiculite or rock fiber as the soil. Two sunny lettuce seedlings (each having at least one main leaf) were planted in the soil for each of the following 6 test conditions. Six different test conditions, namely the combinations of two types of soils and 3 types of nutrient fluids were prepared. The amount of nutrient fluid used was 300 ml. The soil was placed on the PVA film to a depth of about 2 cm. The experiments were performed in a greenhouse using natural sunlight. The temperature of the greenhouse during the experiment was 0 to 25° C., and the humidity was 50 to 90% RH.

The amount of water evaporation and the EC value of the nutrient fluid were measured on day 13 and day 35 from the start of the cultivation. The above-mentioned "peeling strength", which is a yardstick for evaluation of the integration of roots with the film, was also measured on day 35.

The experimental conditions used above can be summarized as follows:
1. Experiment
1) Film: PVA 40 μm (manufactured and sold by Aicello Chemical Co., Ltd.), 200×200 mm;
2) Seedling: Sunny lettuce seedlings (having at least one main leaf);
3) Soil: vermiculite (fine particles) or rock fiber 66R;
4) Nutrient fluid: water, an aqueous 100-fold diluted Hyponex solution or an aqueous 1000-fold diluted Hyponex solution;
5) Equipment: A set of a sieve basket and a bowl; and
6) Place of experiment: Greenhouse (without control of temperature and humidity).
7) Experimental method: After placing the film (200×200 mm) in a sieve basket, either 150 g of vermiculite (moisture: 73%, dry weight: 40 g) or 200 g of rock fiber (moisture: 79%, dry weight: 40 g) was disposed on the film, and two seedlings were planted therein. The resultant sieve basket was placed in a bowl containing 240 g to 300 g of water or a nutrient fluid to contact the film with water or the nutrient fluid, thereby cultivating the planted seedlings.
8) Cultivation period: October 29 to December 4.

The results of the above-mentioned experiment are shown in Table 2 below.

In Table 2, when two EC values are shown, the values are "EC before addition of liquid fertilizer/EC after addition of liquid fertilizer".

TABLE 2

| | | Experiment No. | | | | | |
|---|---|---|---|---|---|---|---|
| | | 1-1 | 1-2 | 1-3 | 2-1 | 2-2 | 2-3 |
| Experimental conditions | Film | PVA 40 μm | | | | | |
| | Seedling | Sunny lettuce having at least 1 main leaf; two seedlings for each experiment | | | | | |
| | Soil | Vermiculite | | | Rock fiber | | |
| | Dilution factor for liquid fertilizer | 100-fold | 1000-fold | water | 100-fold | 1000-fold | water |
| Experimental results | | Amount of water evaporation (g) | | | | | |
| | Day 13 | 107 | 105 | 105 | 124 | 124 | 114 |
| | Day 35 | 201 | 201 | 182 | 221 | 231 | 209 |
| | | EC (dS/m) of liquid fertilizer | | | | | |
| | Day 0 | 3.6 | 0.61 | — | 3.6 | 0.61 | — |
| | Day 13 | 3.3/3.4 | 0.58/0.58 | — | 3.3/3.5 | 0.64/0.64 | — |
| | Day 35 | 4.2 | 0.31 | 0.18 | 4.2 | 0.52 | 0.36 |
| | Total weight (g) of stems and leaves | 5 | 3 | <1 | 2 | 2 | <1 |

TABLE 2-continued

| | Experiment No. | | | | | |
|---|---|---|---|---|---|---|
| | 1-1 | 1-2 | 1-3 | 2-1 | 2-2 | 2-3 |
| Peeling strength (g) | 260 | 160 | 8 | 25 | 110 | 3 |

(Explanation on the Experimental Results)

As apparent from the Table above, contrary to the results obtained by feeding water below the film, not only the growth of the plants but also the integration of the roots with the film were remarkably enhanced when a nutrient fluid was fed to the lower surface of the film. The results demonstrate that the plants have absorbed not only water but also fertilizer components through the film. Further, it is considered that the integration of the roots with the film is a result of the necessity of a strong adhesion between the roots and the film for efficiently absorbing water and fertilizer components through the film.

Example 3

Salt and Water Permeability Test

Various films were subjected to a salt and water permeability test in accordance with the method described above under the section <Salt/water permeability test of film 1>. The following 6 types of films were used: a PVA film, BOVLON (a biaxially oriented PVA film), a hydrophilic polyester film, a cellophane film, a PH-35 film and a nonwoven fabric of ultrafine fiber (Shaleria). The results of the above experiment are summarized in the following Table 3.

TABLE 3

| | EC (dS/m) of the saline solution | | | | | |
|---|---|---|---|---|---|---|
| Days | PVA film and Saline solution | BOVLON and Saline solution | Hydrophilic polyester film and Saline solution | Cellophane film and Saline solution | PH-35 film and Saline solution | Nonwoven fabric and Saline solution |
| 0 days | 9 | 9 | 9 | 9 | 9 | 9 |
| 1 day | 6.2 | 8.2 | 5.8 | 5.3 | 9.1 | 4.7 |
| 2 days | 5.1 | 7.6 | 5.1 | 4.8 | 9 | 4.8 |
| 3 days | 5 | 7.5 | 5 | 4.8 | 9.1 | 4.9 |
| 4 days | 4.9 | 7.1 | 5 | 4.8 | 9 | 4.9 |

| | EC (dS/m) of water | | | | | |
|---|---|---|---|---|---|---|
| Days | PVA film and Water | BOVLON and Water | Hydrophilic polyester film and Water | Cellophane film and Water | PH-35 film and Water | Nonwoven fabric and Water |
| 0 days | 0.2 | 0.2 | 0.2 | 0.2 | 0.2 | 0.2 |
| 1 day | 3.7 | 1 | 3.8 | 4.2 | 0.2 | 3.8 |
| 2 days | 4.5 | 1.8 | 4.5 | 4.7 | 0.2 | 4.6 |
| 3 days | 4.8 | 2.2 | 4.8 | 4.7 | 0.2 | 4.8 |
| 4 days | 4.8 | 2.7 | 4.8 | 4.8 | 0.2 | 4.8 |

(Explanation on the Experimental Results)

Among the 6 films tested, the nonwoven fabric of ultrafine fiber (Shaleria), the PVA film, the hydrophilic polyester film and the cellophane film exhibited high salt permeability. BOVLON exhibited only a low salt permeability, and the microporous polypropylene film (PH-35) exhibited no permeability to salt. The results of the experiment show that, from the viewpoint of salt permeability, the microporous polypropylene film (PH-35) is not suitable for use in the present invention.

Example 4

Dextrose Permeability Test

Various films were subjected to a dextrose permeability test in accordance with the method described above under the section <Water/glucose solution permeability test>. The following 5 types of films were used: a PVA film, BOVLON biaxially oriented PVA film), a cellophane film, a permeable cellophane film and a PH-35 film. The results of the above experiment are summarized in the following Table 4.

TABLE 4

Change in Brix concentration (%) with time

| Time (hrs) | PVA/ water system | PVA/ sugar system | Cellophane/ water system | Cellophane/ sugar system | Permeable cellophane/ water system | Permeable cellophane/ sugar system | PH-35/ water system | PH-35/ sugar system | BOVLON/ water system | BOVLON/ sugar system |
|---|---|---|---|---|---|---|---|---|---|---|
| 0 | 0 | 4.9 | 0 | 4.9 | 0 | 4.9 | 0 | 4.9 | 0 | 4.9 |
| 23.5 | 0.9 | 3.8 | 1.3 | 3.4 | 1.5 | 3 | 0 | 4.8 | 0 | 4.9 |
| 36.5 | 1.3 | 3.2 | 2 | 2.8 | 2.2 | 2.8 | 0 | 4.9 | 0 | 4.9 |
| 47.5 | 1.7 | 3.1 | 2.2 | 2.6 | 2.3 | 2.6 | 0 | 4.9 | 0 | 4.9 |
| 60.5 | 1.8 | 2.8 | 2.4 | 2.6 | 2.4 | 2.6 | 0 | 4.8 | 0 | 4.9 |
| 71.5 | 2.1 | 2.8 | 2.5 | 2.5 | 2.5 | 2.6 | 0 | 4.9 | 0 | 4.8 |
| 85 | 2.2 | 2.7 | 2.5 | 2.6 | 2.5 | 2.6 | 0 | 5 | 0 | 4.7 |
| 95.5 | 2.3 | 2.6 | 2.6 | 2.5 | 2.6 | 2.6 | 0 | 4.9 | 0.1 | 4.7 |
| 119.5 | 2.4 | 2.6 | 2.5 | 2.5 | 2.5 | 2.5 | 0 | 4.9 | 0.2 | 4.5 |

(Explanation on the Experimental Results)

Among the 5 films tested, the PVA film, the cellophane film and the permeable cellophane film exhibited excellent dextrose permeability, but BOVLON exhibited almost no dextrose permeability. Further, no dextrose permeability was observed with respect to the PH-35 film. The results of the present experiment show that, from the viewpoint of dextrose permeability, the films which are advantageous for use in the present invention are the PVA film and the cellophane film.

Example 5

Water Pressure Resistance Test

As explained above, water pressure resistance test with respect to 200 cm $H_2O$ was performed in accordance with JIS L1092 (method B).

(Results of the Experiment)

TABLE 5

| Film type | Water pressure resistance (cm $H_2O$) |
|---|---|
| PVA film (40 μm) | 200 or more |
| Biaxially oriented PVA film (BOVLON) | 200 or more |
| Cellophane film | 200 or more |

TABLE 5-continued

| Film type | Water pressure resistance (cm $H_2O$) |
|---|---|
| Hydrophilic polyester film | 200 or more |
| Nonwoven fabric of ultrafine fibers | 0 |

(Explanation on the Experimental Results)

In the present invention, one of the important functions of a film having excellent water resistance is to enhance integration between plant roots and the film by preventing the infiltration of water through the film from the lower side to upper side of the film, wherein the infiltrated water frees the plant from the necessity to absorb water or a nutrient fluid through the film. In addition, the film must simultaneously prevent the plant contamination with microorganisms, bacteria and viruses present below the film. The results of the experiment show that, from the viewpoint of the water resistance of the film, nonwoven fabrics and woven fabrics having pores therein (such as a nonwoven fabric of ultrafine fiber) are not suitable for use in the present invention.

As apparent from Examples 2, 3, 4 and 5 above, films which simultaneously exhibit excellent salt and dextrose permeability and excellent water resistance are limited to nonporous hydrophilic films made of a PVA, a cellophane, a hydrophilic polyester and the like. The integration between the roots and the film are achieved only when the nonporous hydrophilic film is used.

INDUSTRIAL APPLICABILITY

In the plant cultivation system of the present invention, plant roots and ground soil are maintained to be separated from each other by a film and, therefore, the roots are not in direct contact with the soil. Even when the ground soil is contaminated with pathogenic microorganisms and pathogenic bacteria, the microorganisms and bacteria are incapable of passing through the film and do not get in contact with the plant roots. Accordingly, the present invention is capable of preventing plant contamination, such as sequential cropping disorder. Further, even when the ground soil is contaminated with residual agrochemicals, the use of the system of the present invention enables the reduction of plant contamination by separating the soil from the roots.

BRIEF DESCRIPTION OF DRAWINGS

FIG. 1 A schematic cross-sectional view of an example of a basic embodiment of the plant cultivation system of the present invention.

FIG. 2 A schematic cross-sectional view of an example of another embodiment of the plant cultivation system of the present invention.

FIG. 3 A schematic cross-sectional view of an example of still another embodiment of the plant cultivation system of the present invention.

DESCRIPTION OF REFERENCE NUMERALS

1: Nonporous hydrophilic film; 2: Water impermeable material; 3: Irrigation means (at the side of the water impermeable material); 4: Plant cultivation support (soil); 5: Evaporation reducing material; 6: Irrigation means (at the side of the plant cultivation support); 7: Mist spraying valve; 8: Water absorbing material; and 9: Frame for the plant cultivation support

The invention claimed is:

1. A plant cultivation system comprising:
   a nonporous hydrophilic film for cultivating a plant thereon,
   a feeding means for feeding water or a nutrient fluid to the lower surface of said nonporous hydrophilic film in the absence of a hydroponic tank for accommodating water or a nutrient fluid and cultivating a plant therein, said feeding means comprising at least one layer selected from the group consisting of a water impermeable material layer and a water absorbing material layer, which is laid and extends under said nonporous hydrophilic film, wherein, when said feeding means comprises both of said water impermeable material layer and said water absorbing material layer, said water absorbing material layer is disposed between said nonporous hydrophilic film and said water impermeable material layer and is in contact with the lower surface of said nonporous hydrophilic film, and
   a drip tube as an irrigation means for supplying water or a nutrient fluid to said feeding means, said drip tube disposed below said nonporous hydrophilic film in a manner such that water or nutrient fluid supplied from said drip tube is fed to the lower surface of said nonporous hydrophilic film; wherein said nonporous hydrophilic film is a film which exhibits an electrical conductivity (EC) difference of 4.5 dS/m or less, said EC difference being determined by a method comprising contacting water with a saline solution having a salt concentration of 0.5% by weight through said nonporous hydrophilic film, measuring the electrical conductivity of each of the water and the saline solution 4 days (96 hours) after the start of the contact, and calculating the difference in electrical conductivity between the water and the saline solution.

2. The plant cultivation system according to claim 1, which comprises said water impermeable layer, and in use thereof, is installed on ground soil in a manner such that said water impermeable material layer contacts the ground soil.

3. The plant cultivation system according to claim 1, wherein said nonporous hydrophilic film is a film which exhibits a Brix concentration (%) difference of 4 or less, said Brix concentration (%) difference being determined by a method comprising contacting water with a glucose solution having a glucose concentration of 5% by weight through said nonporous hydrophilic film, measuring the Brix concentration (%) of each of the water and the glucose solution 3 days (72 hours) after the start of the contact, and calculating the difference in Brix concentration (%) between the water and the glucose solution.

4. The plant cultivation system according to claim 1, wherein said nonporous hydrophilic film is a film which has a peeling strength of 10 g or more, said peeling strength being measured by a method comprising disposing and cultivating a plant body on said nonporous hydrophilic film and peeling said film from the root of the plant body on day 35 from the start of the cultivation to measure the strength (g) needed for the peeling.

5. The plant cultivation system according to claim 1, wherein said nonporous hydrophilic film is a film which has a water impermeability of 10 cm or more in terms of water pressure resistance.

6. The plant cultivation system according to claim 1, wherein the water or the nutrient fluid supplied from said drip tube is in an amount which is the minimum required amount determined in respect of the growth stage of the plant being cultivated.

7. The plant cultivation system according to claim 1, which further comprises a plant cultivation support disposed on said nonporous hydrophilic film.

8. The plant cultivation system according to claim 1, which further comprises a mulching material disposed on or above said nonporous hydrophilic film.

9. The plant cultivation system according to claim 1, which further comprises a supplemental feeding means for supplying water or a nutrient fluid to the upper side of said nonporous hydrophilic film, wherein the supply of the water or the nutrient fluid from said supplemental feeding means is controlled in respect of the growth stage of the plant being cultivated.

10. The plant cultivation system according to claim 1, wherein said water impermeable material layer is a synthetic resin film.

11. A method for cultivating a plant, which comprises the steps of:
   (1) providing the plant cultivation system of claim 1,
   (2) placing a plant on the nonporous hydrophilic film of said plant cultivation system, and
   (3) cultivating the plant on the nonporous hydrophilic film, while supplying water or a nutrient fluid by the drip tube to the feeding means of said system, whereby the water or the nutrient fluid supplied by the drip tube is fed to the plant through the nonporous hydrophilic film.

* * * * *